Aug. 23, 1960     J. BAUER ET AL     2,950,221
METHOD OF PRODUCING FOAM BACKED CARPET, AND PRODUCT
Filed Dec. 21, 1956
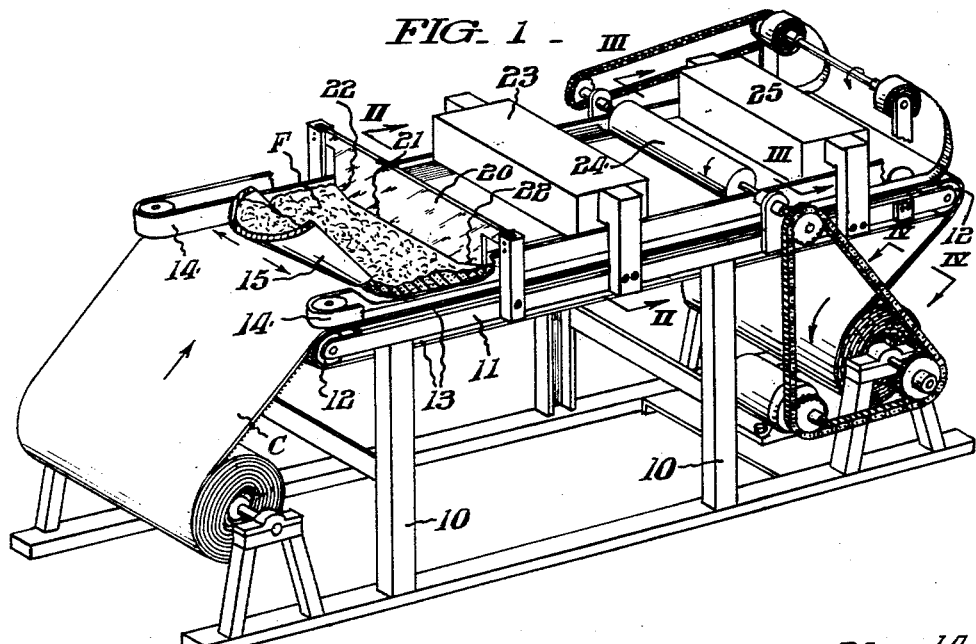
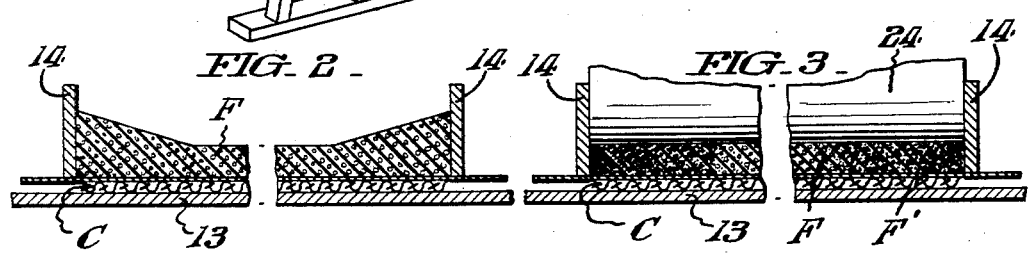
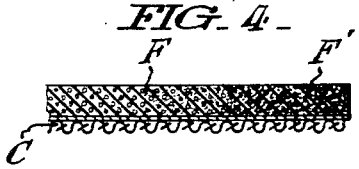
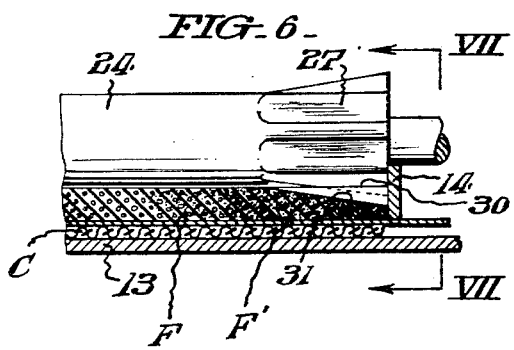
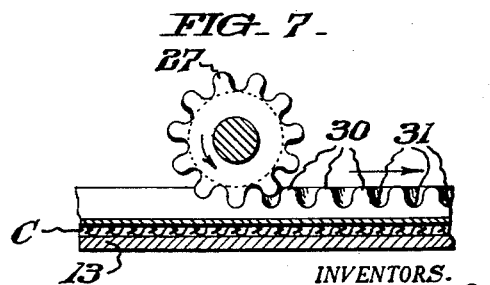
INVENTORS.
Jackson Bauer &
Clarence Campbell,
BY Paul & Paul
ATTORNEYS

United States Patent Office 2,950,221
Patented Aug. 23, 1960

2,950,221

METHOD OF PRODUCING FOAM BACKED CARPET, AND PRODUCT

Jackson Bauer, Croyden, Pa., and Clarence Campbell, Roxboro, N.C., assignors to Collins and Aikman Corporation, New York, N.Y., a corporation of Delaware Filed Dec. 21, 1956, Ser. No. 629,876

4 Claims. (Cl. 154—100)

This invention relates to a method of making foam backed carpet, and to a foam backed carpet product produced in accordance with the method. More particularly, this invention relates to a foam backed carpet having substantially uniform resiliency and having excellent strength characteristics along the edges, notwithstanding the inherent weakness of foam rubber, permitting edge to edge seaming which is resistant to scuffing and wear.

It is an object of this invention to provide a foam backed carpet having edge portions of such strength that two pieces of foam backed carpet may be laid down on a floor in edge to edge relation without requiring a special seaming technique in order to produce a seam which has excellent resistance to scuffing and other wear. Another object of this invention is to provide a relatively inexpensive foam backed carpet having excellent performance and strength characteristics, and which produces a strong seam when abutted in edge to edge relation with another similar foam backed carpet. Another object is to provide a method of producing such a carpet wherein the foam is applied to the carpet in successive coats, with relatively inexpensive foam arranged along a body portion and relatively strong foam along the edges. Another object of this invention is to produce a foam backed carpet wherein the foam at the edges has greatly improved resistance to tearing as compared to that heretofore known. Still another object of this invention is to provide a method of producing foam backed carpet of the character heretofore described, which does not require the use of different forms or grades of foam rubber on different portions of the carpet, and which method may be carried out utilizing a single feed of foam extending entirely across the carpet from edge to edge thereof. Still another object of this invention is to proved a method of the character just referred to, having the advantages of mass production, including economy and quality control. Other objects and advantages of this invention, including the simplicity and economy of the same and the ease and versatility with which carpets in accordance with this invention may be stored, shipped and laid, will further become apparent hereinafter and in the drawing of which:

Fig. 1 represents a view in perspective showing one form of apparatus and method which are particularly useful for practicing this invention.

Figs. 2, 3 and 4 represent sectional views taken as indicated by the lines and arrows II—II, III—III and IV—IV, respectively, which appear in Fig. 1.

Fig. 5 represents a sectional view similar to Fig. 4, showing a modified form of this invention.

Fig. 6 is an end view of a corrugating roller utilized in accordance with this invention, showing how it provides corrugations in the edge portion of the foam backing of the carpet, and Fig. 7 represents a view looking toward the end of the roller and the edge of the carpet, taken as indicated by the lines and arrows VII—VII which appear in Fig. 6.

Turning now to the specific form of the invention selected for illustration in the drawings, Fig. 1 shows diagrammatically a foaming range which is adapted to apply foam F by flowing it on the back of a flat fabric carpet C. Foaming may conveniently be carried out in the general manner disclosed in Alderfer Patent No. 2,426,572, granted August 26, 1947.

The foaming range is supported on legs 10, and has horizontal structural members 11 supporting rollers 12 and a (waxed) rubber belt 13 forming a support for the carpet C. Means including a motor, sprockets, chains and shafts are provided, as shown, for moving the carpet C continuously at a constant speed along with the surface of the belt 13. At the sides of the conveyor thus formed, and above the surface of the carpet C, are a pair of opposed side conveyor belts 14 which are arranged to travel at a linear speed equal to the linear speed of travel of the carpet C. These conveyors 14 form dams which extend along the side of the foaming range, for the purpose of containing the foam to a location just above the carpet C. Stationary walls or other dams may, where desired, be used.

As shown in the drawings, the foam F is introduced on top of the carpet C by causing it to flow downwardly through an oscillating trough 15 which applies the foam to the entire back of the carpet, including the edge portions of the carpet, but preferably not the selvage.

The number 20 designates a doctor blade extending across the entire width of foam on the carpet. The doctor blade 20 has a generally horizontal central blade portion 21 and, at each edge thereof just above the outer edges of the carpet C, the doctor blade has upwardly outwardly inclined blade portions 22, 22. The central portion of the blade 21 levels off the foam, producing a central portion comprising a foam backing of uniform thickness. The inclined blade portions 22, 22 build up the thickness of the foam at each edge of the carpet, producing a foam which increases gradually in thickness in a direction away from the central or body portion of the foam. (When the foam is originally prepared, a thickener such as a sodium polyacrylate is added to increase viscosity and thus help retain the shape formed by the doctor blade. Use of a well-regulated foam density, to help maintain form, is also indicated.)

The number 23 designates a gelling chamber wherein the foam is gelled in accordance with conventional practice, and the number 24 is a plain cylindrical roller riding free on its shaft and extending completely across the foam, and at a height adjustable above the carpet backing which is equal to the desired thickness of the rubber in the final foam backed carpet. Roller 24 may carry any suitable marking, such as a trademark or an arrow (for example) distinguishing one edge of the carpet from the other, etc. The roller 24 (driven by the movement of the foam) compresses the upwardly outwardly inclined wedge-shaped portions of the foam at the edge, changing such edge portions of foam from the arrangement illustrated in Fig. 2 to the arrangement illustrated in Fig. 3. The compressive action of the roller 24 increases the density of the gelled foam at the edge portions, such density being gradually increased in a direction away from the foam body portion. It will be appreciated that the compressed foam along the edges of the carpet is firmly secured to the foam in the central or body portion, but that it gradually increases in density and strength, which reach a maximum at or near the very edge of the carpet.

The number 25 designates a curing chamber wherein the gelled and compressed rubber is vulcanized or otherwise cured in final form, thereby producing the product illustrated in Fig. 4, having a compressed edge portion F'.

Fig. 5 designates a modified form of the invention, wherein a plurality of individual fibers 26 are imbedded at random in the foam.

Turning now to Figs 6 and 7 of the drawings, it will be appreciated that the roller 24 may have a corrugated end portion 27, which provides in the edge portions of the foam backing a plurality of corrugations which, as shown in Fig. 7, are in the form of continuously extending peaks 30 and valleys 31. The peaks 30 are substantially parallel to the surface of the foam body portion and, as shown in the drawings, the valleys 31 are upwardly inwardly inclined toward the foam body portion. This is an important and advantageous feature of this invention, since it is important to provide a carpet having edge portions which produce seams that are resistant to scuffing and wear, but which edge portions have substantially the same resilience as the central portions of the carpet when walked upon. Since the density of the edge portion of the foam gradually increases toward the edge, its resilience gradually decreases, offering more resistance when walked upon. The corrugations 30, 31, which gradually decrease in depth away from the edge of the carpet, tend to equalize this added resistance, with the result that difference in density across the carpet is not noticeable when the carpet is walked upon.

It will be appreciated that, although Figs. 6 and 7 show corrugations of specific forms, other forms may readily be substituted. For example, in some cases it is not necessary to incline the valley portions 31 upwardly away from the edge of the carpet backing, and such valleys may be substantially parallel to the plane of the carpet. Other modifications of the form and arrangement of the corrugations may be made, and in some instances the corrugations may be omitted entirely, as appears in Fig. 4, for example.

The process described herein is preferably combined with treatment of the back of the carpet material to provide an optimum fabric-to-foam bond. An anchor coat of wet latex is applied to the back of the carpet, and it is not dried or cured prior to application of foam. The anchor coat and foam coat are simultaneously dried and cured. This may be done either over the entire width of the fabric before foaming or, on the other hand, by anchor coating, drying and vulcanizing partially or completely over the body of the fabric except the outside edges, then wet anchor-coating the edge portions of the back of the carpet, foaming the edges, gelling, and curing.

Although the foregoing disclosure has referred particularly to foam rubber as the carpet backing medium, it will be appreciated that various other forms of cellular materials, such as vinyl, polyeurethane, or other foamed or blown elastomeric materials may be used.

The foam backed carpet has excellent strength and resistance to scuffing and wear, even when the leg of a chair, for example, is drawn sidewise over a seam wherein two foam backed carpets are seamed in edge to edge abutting relationship. When the features of this invention are properly utilized, it is unnecessary to provide any fabric reinforcement for the edge of the foam backing.

Various modifications may be made as to the form and arrangement of the product, and as to the method by which it is manufactured. When different foams are applied to the edge and body portions of the carpet, different doctor blade shapes are preferred, and two or more doctor blades may be used, one for the central or body portion of the foam, and another for the edge portions, successively.

It will be appreciated that the foam may be applied in one or two separate steps (or more), with or without curing or curing and vulcanizing at each step. One such step (body portion) may be practiced with the fabric poured on the fabric, and the next step with the fabric on top of the foam. These steps may also be reversed, as will be apparent.

As an example, an alternate method of producing the foam backed carpet wherein two different foam compounds may be employed, comprises a two step method of foam application. The first step involves the use of a doctor blade extending across the entire width of foam on the carpet. The doctor blade has a generally horizontal central blade portion and at each edge thereof, just above the outer edges of the carpet the doctor blade has downwardly outwardly inclined blade portions. The central portion of the blade levels off the foam, producing a central portion comprising a foam backing of uniform thickness. The inclined portions taper off the thickness of the foam at each edge of the carpet, producing a foam which decreases gradually in thickness in a direction away from the central or body portion of the foam but not extending to the edge of the fabric body; thereby leaving an unfoamed strip along the fabric edge. The second coat of foam is applied using a doctor blade 20, which allows a thin wipe coat over the central portion of the first foam coat and a raised edge portion along the edges for subsequent compression. Such a method allows the use of a first coat of foam having different properties or comprising less expensive materials than those in the second coat.

The belt 13 need not be a waxed rubber belt, and may be any belt so designed or treated as to release readily the carpet or foam. Also, it is possible to use more than one of the rolls 24, arranged in series, to compress the foam gradually, with the last roll barely touching the foam surface and extending from edge to edge. Equivalent elements may be substituted for those specifically shown and described, certain of the parts and method steps may be reversed, and certain features of the invention may be used independently of other features, all within the spirit and scope of the invention as defined in the appended claims.

Having thus described our invention, we claim:

1. In a method of making foam backed carpet having a substantially uniform thickness, the steps which comprise applying foam to the back of the carpet fabric, distributing said foam along the edges of the carpet fabric and the intervening body portion as well, maintaining said fabric body portion essentially flat and levelling off the surface of the foam above said body portion in a plane parallel to the plane of the carpet, building up the foam along said edges in the form of a wedge having a thickness greater than the thickness of said body portion, gelling the foam edge and body portions in this relation, compressing the gelled wedge-shaped edge portions to about the thickness of said body portion, and curing the product.

2. In a method of making foam backed carpet having a substantially uniform thickness, the steps which comprise applying foam to the back of the carpet, distributing said foam along the edges of the carpet fabric and the intervening body portion as well, maintaining said fabric body portion essentially flat and levelling off the surface of the foam above said body portion in a plane parallel to the plane of the carpet fabric, building up the foam along said edges in the form of a wedge having an upwardly outwardly inclined upper surface having its greatest thickness at its outer edge, such thickness being greater than the thickness of said body portion, gelling the foam edge and body portions in this relation, and locally compressing and corrugating the gelled edge portions to about the thickness of said body portion.

3. Foam backed carpet comprising carpet material having a fabric back including a substantially flat generally central fabric body portion and a substantially flat edge fabric portion extending along said body portion, a foam body portion of substantially uniform thickness and density affixed to said body portion of said carpet material, and a foam edge portion of substantially uniform thickness and of substantially the same thickness as said foam body portion affixed to said edge portion of carpet material and formed integrally with said foam body portion, said foam edge portion increasing gradually in density in a direction away from said foam body portion such that the density at the extreme edge is much greater than the density of said foam body portion.

4. Foam backed carpet comprising carpet material having a back including a flat fabric body portion and an edge fabric portion extending along in the plane of said body portion, a foam body portion of substantially uniform thickness and density affixed to said body portion of said carpet material, and a foam edge portion of substantially uniform overall thickness and of substantially the same overall thickness as said foam body portion affixed to said edge portion of carpet material and formed integrally with said foam body portion, said foam edge portion being corrugated in form and increasing gradually in density in a direction away from said foam body portion such that the density of foam at the extreme edge is much greater than that of said foam body portion.

References Cited in the file of this patent

UNITED STATES PATENTS

| | | |
|---|---|---|
| 711,840 | Fernald | Oct. 21, 1902 |
| 1,805,038 | Derr | May 12, 1931 |
| 1,974,325 | Banas | Sept. 18, 1934 |
| 2,194,364 | Minor | Mar. 19, 1940 |
| 2,434,527 | Untiedt | Jan. 13, 1948 |
| 2,641,296 | Marco | June 9, 1953 |
| 2,681,377 | Smithers | June 15, 1954 |
| 2,702,769 | Alderfer | Feb. 22, 1955 |
| 2,752,279 | Alderfer | June 26, 1956 |
| 2,762,738 | Teale | Sept. 11, 1956 |

UNITED STATES PATENT OFFICE

CERTIFICATE OF CORRECTION

Patent No. 2,950,221                  August 23, 1960

Jackson Bauer et al.

It is hereby certified that error appears in the printed specification of the above numbered patent requiring correction and that the said Letters Patent should read as corrected below.

Column 1, line 48, for "proved" read -- provide --.

Signed and sealed this 4th day of April 1961.

(SEAL)
Attest: ERNEST W. SWIDER

Attesting Officer

ARTHUR W. CROCKER
Acting Commissioner of Patents